United States Patent [19]
Johnson

[11] Patent Number: 6,019,171
[45] Date of Patent: Feb. 1, 2000

[54] DOWN FLOW, TWO PASS RADIATOR WITH AUTOMATIC AIR VENTING MEANS

[75] Inventor: Colin Van Tuyl Johnson, New York, N.Y.

[73] Assignee: General Motors Corporation, Detroit, Mich.

[21] Appl. No.: 09/195,114

[22] Filed: Nov. 18, 1998

[51] Int. Cl.$^7$ ........................................................ F28F 9/02
[52] U.S. Cl. ..................... 165/174; 165/104.32; 165/297; 165/298; 123/41.54; 236/93 R; 236/99 K; 137/468
[58] Field of Search ......................... 165/174, 71, 104.32, 165/297, 298; 123/41.54; 137/468; 236/93 R, 99 K

[56] References Cited

U.S. PATENT DOCUMENTS

| | | | |
|---|---|---|---|
| 3,712,342 | 1/1973 | Lang | 236/93 R |
| 4,086,956 | 5/1978 | Block et al. | 165/297 |
| 4,175,697 | 11/1979 | Dreibelbis | 165/297 X |
| 4,176,786 | 12/1979 | Braukmann | 236/99 K |
| 4,366,858 | 1/1983 | Moranne | 165/104.32 |
| 4,491,174 | 1/1985 | Villeval | 165/104.32 |
| 4,747,446 | 5/1988 | Polidori et al. | 165/104.32 |
| 4,781,247 | 11/1988 | Schulz | 165/104.32 |
| 4,781,575 | 11/1988 | Ferri et al. | 236/93 R |
| 4,846,265 | 7/1989 | Broglio | 165/104.32 |
| 5,305,826 | 4/1994 | Couëtoux | 165/297 X |
| 5,632,256 | 5/1997 | Eibl | 165/297 |

*Primary Examiner*—Christopher Atkinson
*Attorney, Agent, or Firm*—Patrick M. Griffin

[57] ABSTRACT

A down flow, two tank, two pass radiator includes a flow division baffle in the center of the upper tank that automatically vents any air trapped behind the baffle as the engine operates. When the engine starts, colder coolant has contracted a thermo wax operated baffle slide to an open position, allowing any trapped air to vent through. As the engine and coolant warm to normal operating temperature, the wax expands, pushes the slide closed, and the baffle operates as a solid piece.

1 Claim, 3 Drawing Sheets

DOWN FLOW, TWO PASS RADIATOR WITH AUTOMATIC AIR VENTING MEANS

TECHNICAL FIELD

This invention relates to down flow, two pass radiators in general, and specifically to such a radiator in which the upper tank includes a means to automatically, passively vent trapped air between two sections of the tank.

BACKGROUND OF THE INVENTION

Vehicle radiators have two manifold tanks that interconnect a plurality of generally parallel flow tubes, feeding coolant through the tubes in one or several passes. In the case of multi-pass flow, the interiors of one or more of the tanks contain solid baffles which divide the tanks up into two or more sections, thereby dividing the flow tubes up into two or more passes. Radiators may also be mounted in a cross flow or down flow orientation. In a cross flow orientation, the tanks are generally vertical, one on either side of the radiator, with horizontal flow tubes. A down flow radiator is turned ninety degrees, with one tank horizontal at the top, one horizontal at the bottom, and generally vertical flow tubes. With either orientation, a removably capped filler neck opens through one end of one tank (either a side tank or a top tank) to allow the radiator to be filled with coolant. Fluid fill is infrequent, occurring either during vehicle assembly or later, during vehicle service. In either case, the coolant displaces air in the radiator, which needs to be vented to assure a solid and complete fluid fill. In a single pass radiator, with no baffles dividing up the interior of the tank, air bubbles in the fluid will naturally float and flow upward without interference toward the highest open point in the radiator, which is the open filler neck, where they can ultimately vent to atmosphere. With a multi pass design however, especially a two pass radiator with a down flow orientation, a unique venting problem is presented. A flow dividing baffle divides the center of the top tank into two sections, a first section opposite the filler neck, to which the filler neck cannot directly open, and a second section into which the filler neck does open. During coolant fill, air floating upwardly into the top tank's first section will be blocked by the baffle from reaching the second section or the open filler neck, which would jeopardize an adequate fluid fill.

U.S. Pat. No. 5,762,130 issued Jun. 9, 1998 to Uibel, et al. and co-assigned to the assignee of the subject application, discloses a manually operated vent valve near the upper tank baffle which can be selectively accessed and opened from outside the tank to vent trapped air from one side of the baffle to the other. This would be done only infrequently, such as just after coolant fill. It requires a deliberate operation on the part of the assembly or service worker, which takes time. Once the valve is reclosed, there is no provision for venting any air that might be trapped later, from whatever source. Furthermore, the manual valve does pierce the tank wall, creating a potential leak path out. There is also a smaller possibility that air could invade the cooling system during normal operation, not just during coolant fill, as the result of a system leak. This would become trapped and remain trapped on the downside of the baffle, barring a deliberate opening of the valve, which would be very unlikely, as there is no visual indication of such trapped air.

SUMMARY OF THE INVENTION

The invention provides a down flow, two pass radiator with an automatic, passively acting venting means that vents trapped air, if any, from one side of the top tank to the other, during normal vehicle operation, with no deliberate operator action required. The vent means is installed entirely internally to the tank, with no potential outside leak path created.

In the preferred embodiment disclosed, the top tank is a plastic molding with an uppermost wall that slopes continuously upwardly from the far end of the top tank all the way to the filler neck. The vent means sits at the approximate center of the top tank, dividing it into a first section blocked off from the filler neck and a second section that open to the filler neck. Some volume of air continually exists in the filler neck, beneath its closure or cap, during normal operation, and it can vent through the cap's own relief valve, if its pressure rises far enough. Trapped air on the downside of the vent means would be able to collect within and vent below and through the conventional filler cap, if it had a clear path to it.

The vent of the invention provides such a clear vent path, during normal vehicle operation. The vent means disclosed includes a generally U shaped baffle, similar in size and shape to a conventional baffle. The outer edge of the baffle fits closely to the inside surface of the center of the top tank. Rather than being a conventional, solid metal piece, however, it has a hollow, internal track with a central, upper window therethrough. A slide moves within the track, from an upper, closed position that shuts off the window, to a lower, open position that partially uncovers the window. Contained within the track and below the slide is a sealed packet of thermostatically expanding wax, of the type commonly used in vehicle engine thermostats. In its cold, contracted condition, the wax shrinks enough to allow the slide to retract, but pushes the slide closed as it heats up.

Coolant fill will typically occur with a cold engine and radiator, so that the wax will be shrunken, the slide retracted, and the window open. Air rising into the top tank's first section can then float along the inner surface of the upwardly sloping uppermost wall, through the open window, and finally to the open filler neck and out to atmosphere. During later, normal vehicle operation, the window will be open for a short time after start up, but any coolant that by passes the radiator through the open window will be short term, and will occur only when the engine is still relatively cool. The wax soon warms and expands, shutting the window so that the baffle is effectively solid, and the radiator operates unaffected. Should any air have become trapped behind the baffle before engine start up, for whatever reason, it, too, will be able to vent to the other side of the baffle, before the wax warms and the window shuts.

BRIEF DESCRIPTION OF THE DRAWINGS

These and other features of the invention will appear from the following written description, and from the drawings, in which.

DESCRIPTION OF THE PREFERRED EMBODIMENT

Figure 1:
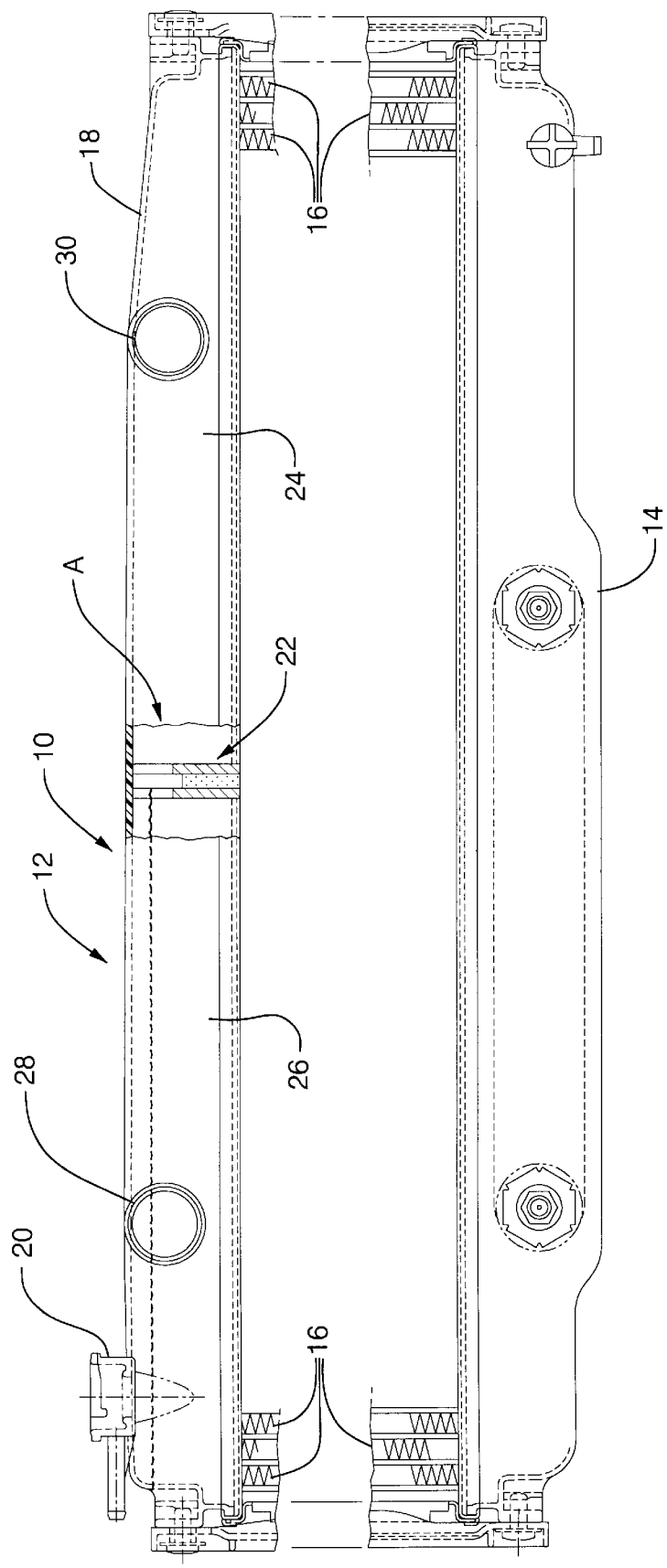
FIG. 1 is a front view of a down flow radiator incorporating a preferred embodiment of the venting means of the invention.

Referring first to FIG. 1, a down flow vehicle radiator incorporating the passively acting baffle of the invention is indicated generally at 10. Radiator 10 has a horizontal top tank, indicated generally at 12, a horizontal bottom tank 14, and a plurality of vertical flow tubes 16 extending therebetween. Each tank 12 and 14 is a molded plastic box, and the top tank 12 has several structural features molded integrally to it. Most significantly, top tank 12 has an uppermost wall 18 which, rather than being horizontal and flat, as is conventional, slopes gradually and continually upwardly from a low end to a high end. Molded through uppermost wall 18 at the high end of top tank 12 is a fill opening in the form of a conventional filler neck 20, which would closed and opened by a conventional filler cap, not illustrated. Near the center of top tank 12, a preferred embodiment of the passively acting vent means of the invention, indicated generally at 22, is installed. During most of the normal operation of the system, the vent means 22 is closed, as a conventional baffle would be, and therefore divides the top tank 12 into a first section 24, blocked off from the filler neck 20, and a second section 26, into which the filler neck 20 opens. A coolant inlet 28 protruding from the front of the second top tank section 26 receives coolant from the vehicle engine which, being blocked by the closed vent means 22, can feed into and flow down through only approximately half of the flow tubes 16, into the bottom tank 14. From there, coolant flows back up the other half of the flow tubes 16 in a U pattern, into the first top tank section 24, and ultimately out of a coolant outlet 30 and back to the engine. This is a so called two pass flow pattern which, while relatively rare in production, can offer improved thermal performance in certain applications. At engine start up, the vehicle will typically have been off long enough for the coolant therein to have reached a relatively cold temperature, ambient temperature if the cooling time has been overnight or any relatively long time. Within a few minutes of operation the coolant will reach a much higher normal operating temperature, sooner in summer and later in winter. The filler cap is on during normal operation, of course, and would include a conventional high pressure release valve for excess vapor or air trapped beneath it in the filler neck 20 should temperatures rise even higher, or should air otherwise enter the system.

Still referring to FIG. 1, an exception to filler neck 20 being closed is coolant fill, either at the factory or during servicing. The filler neck 20 is then freely open to atmosphere, and the engine cooling system and coolant will both likely be relatively cool, if not cold. Since the open filler neck 20 is at a highest point, air displaced from the tanks and tubes would be able to rise into top tank 12 vent freely therefrom, along the dotted line path shown in FIG. 1 if it could reach that point. In a conventional, two pass down flow radiator, however, there is an impediment to such free venting. Any air being displaced up the flow tubes 16 and into the first top tank section 24 would be blocked by the barrier of a conventional, closed baffle located where vent means 22 is shown. The area of trapped air is indicated at A. This could jeopardize a complete, solid liquid fill. Likewise, in the event of something like a head gasket leak, air could become entrapped in the system even during normal operation, not just during coolant fill. A conventional, always closed baffle would also prevent air venting in that case.

Figure 2:
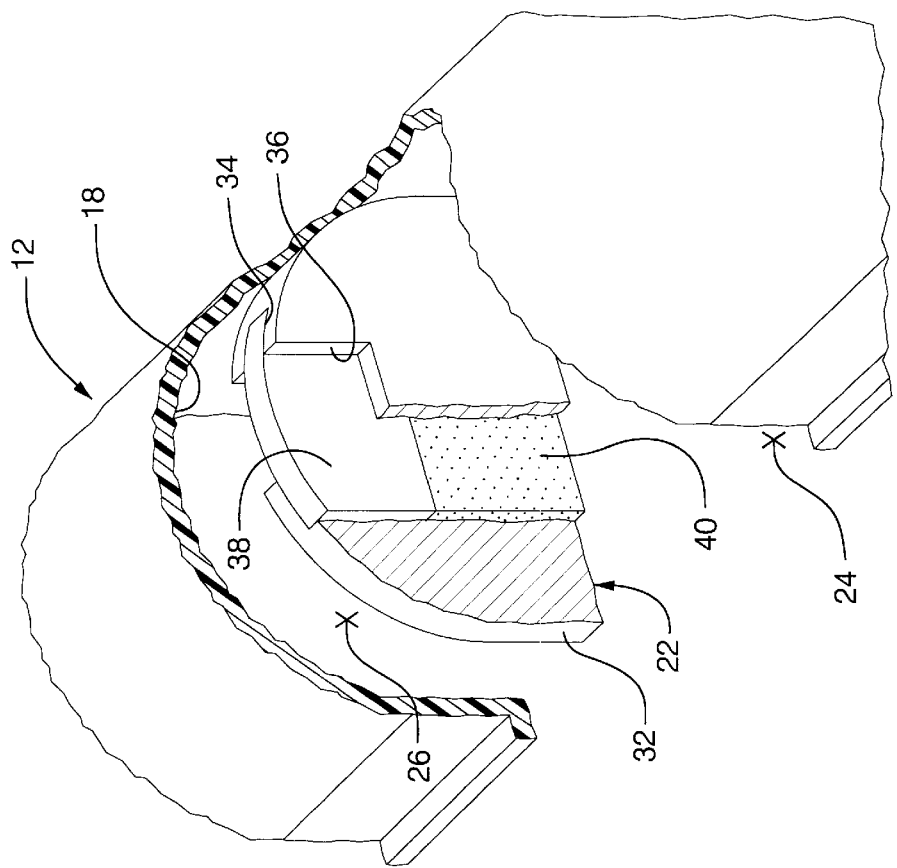
FIG. 2 is a perspective view of just the section of top tank than contains the venting baffle, in the open condition.

Referring next to FIG. 2, the structural details of the vent means 22 of the invention are illustrated. The structural foundation of the vent means 22 is a generally U shaped, aluminum alloy baffle 32. Baffle 32 is similar is size and material to a conventional, one piece baffle, and the outer edge thereof closely engages the inner surface of top tank 12, as well as the tank's header plate. Rather than being one piece and solid, however, baffle 32 contains a hollow, central internal track 34, the upper portion of which is pierced by a vent opening in the form of a simple through window 36. Window 36 is located adjacent the inner surface of the uppermost tank wall 18. Within track 34 is a movable closure in the form of a slide 38, large enough to slide up and close the window 36, rendering it effectively solid. Enclosed within track 34, and below slide 38, is a sealed packet 40 of so called thermo-wax, of the type that is currently used in vehicle engine cooling system thermo stats. Wax 40 shrinks when it cools to temperatures below normal equilibrium coolant operating temperature, but expands significantly at normal coolant operating temperatures. In an engine thermostat, such a wax would expand and shrink to drive a piston thermostat back and forth. Its operation is similar here, but serves a very different purpose.

Figure 4:
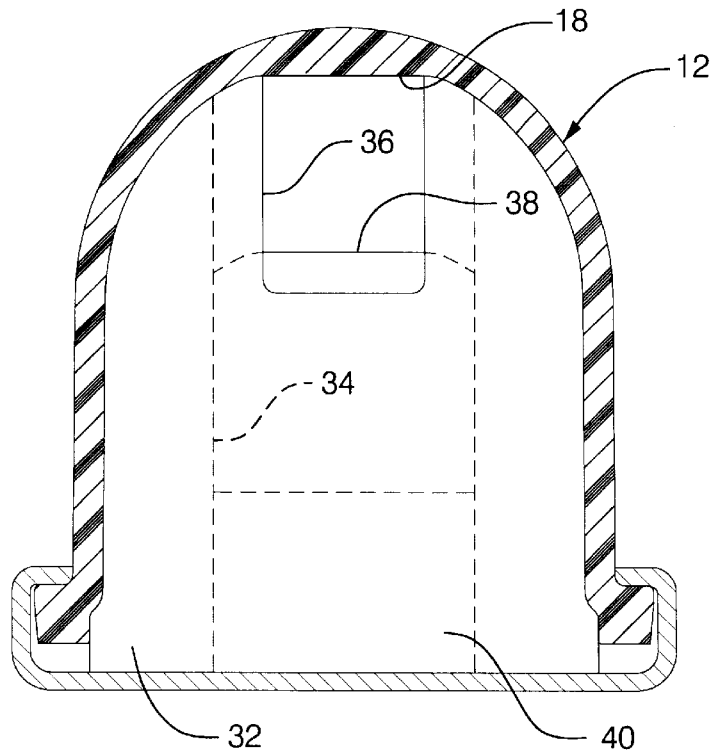
FIG. 4 is a cross sectional view of the top tank corresponding to FIG. 2.

Referring next to FIGS. 2 and 4, the operation of the vent means 22 is illustrated. When cold, the wax 40 is shrunken, as best seen in FIG. 2, so that slide 38 is retracted within track 34 to leave window 36 open. Thus, every time the engine coolant is in a cold condition, be that at the usual morning start up, or during coolant fill, there will be an open path between the two top tank sections 24 and 26. Any air rising up into the tank section 24 will be able to freely vent along the inside of the top wall 18, through the open window 36, into the other tank section 26 and ultimately to the area of the filler neck 20, the highest point. If the filler neck 20 happens to be open, as during coolant fill, the air can vent out freely. Or, if the filler neck 20 is capped during ordinary operation, the vented air can, in the normal course, vent out. At normal engine start up, the open window will provide a partial path for coolant in the opposite direction, that is, from tank section 26 to 24, which is to say direct from inlet 28 to outlet 30, by passing the flow tubes 16. A cold engine condition means that such a by pass flow would not be harmful and, potentially even useful, in severe winter conditions. A quicker engine warm up would occur, as a side benefit.

Figure 3:
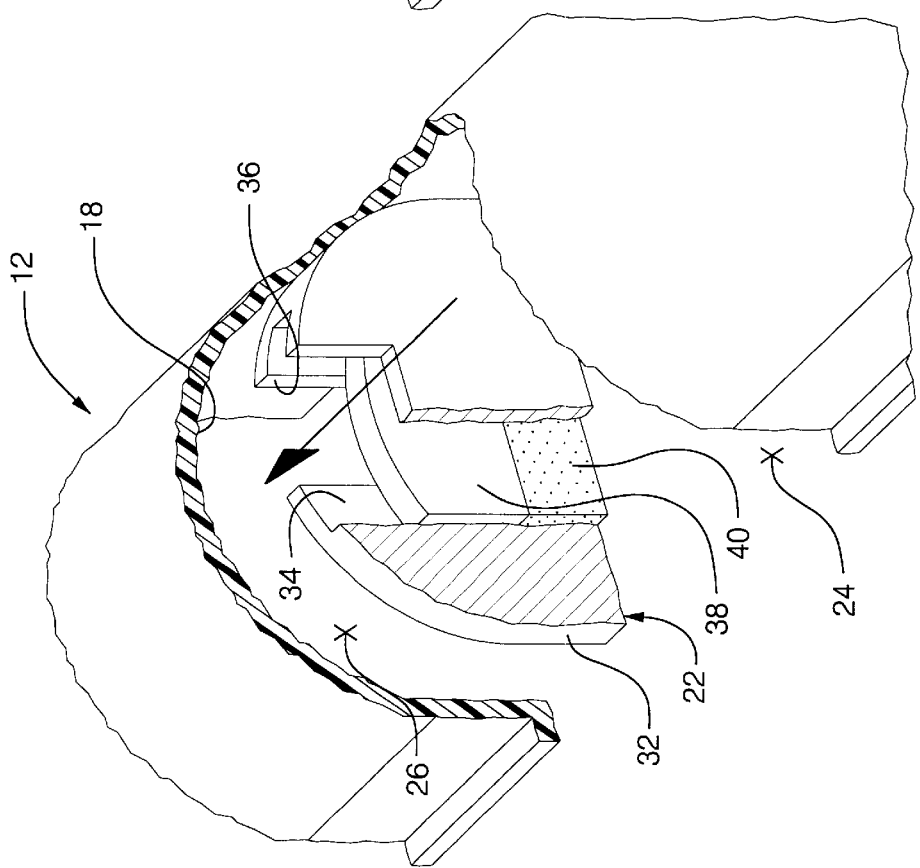
FIG. 3 is a view like FIG. 2, but in the closed position.
Figure 5:
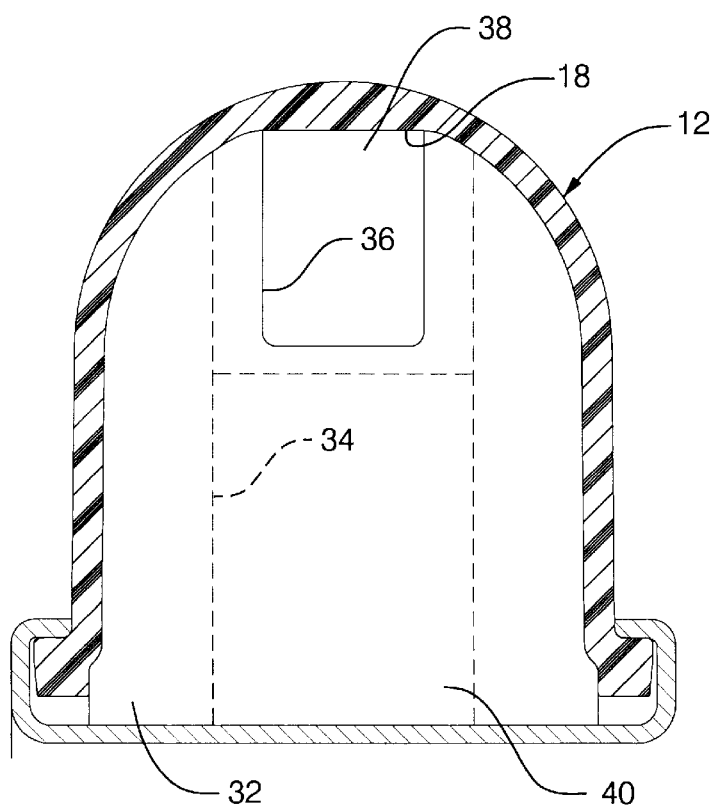
FIG. 5 is a cross sectional view of the top tank corresponding to FIG. 3.

Referring next to FIGS. 3 and 5, the condition of vent means 22 once the coolant system has warmed up is illustrated. Within a very few minutes, the coolant temperature rises high enough to expand the wax 40, and close the slide 38 and window 36. Any trapped air will have had enough time to vent out by that point. The operation of slide 38 is essentially guaranteed by the use of the same wax material currently used in engine thermostats, which is keyed to those very conditions. At that point, the baffle 32 becomes effectively solid, and coolant by pass flow is shut off, giving normal two pass coolant flow through the flow tubes 16. After closure, should air again become trapped in the tank section 24 and against the closed baffle 32 for any reason, such as a minor leak in the cooling system, it will not vent out right away. However, as the vehicle sits and cools, the slide 38 will retract again, reopening the vent path.

Variations in the disclosed embodiment could be made. Any covered opening through the baffle 32 that opened and closed with falling and rising temperature would work. It is most cost effective if the prime mover is a simple, passive mechanical means however, although other such means can be imagined, such as a bi-metal. The wax material 40 is very practical, however, since it is already designed for that very environment. The wax material could move a different kind of mechanical member, such as a piston, but the slide 38 shown fits very well within a baffle 32 that is itself not much different in size than a conventional baffle, being only a bit thicker, but with the same basic outline and shape.

Therefore, it will be understood that it is not intended to limit the invention to just the embodiment disclosed.

I claim:

1. In a vehicle with a radiator having generally horizontally oriented top and bottom tanks with a plurality of generally vertically oriented flow tubes extending between said tanks through which coolant fluid flows during normal operation, said coolant attaining a normal operating temperature as said vehicle operates, and cooling to a lower temperature when said vehicle is not operating, said top tank being divided into a first section and a second section, so as to divide said flow tubes into first and second flow passes, said top tank also receiving air therein that rises upwardly through said flow tubes, the improvement comprising a vent means for both dividing said top tank into said first and second sections and also selectively venting air from the first to the second section of said top tank, comprising, an uppermost wall in said top tank that slopes continuously upwardly from a low end of said uppermost wall to a high end of said uppermost wall, a baffle located in said top tank between said first and second sections and having an outer edge closely engaged with the inner surface of said tank and against said uppermost wall, said baffle having an internal track and a window through said track located near said uppermost wall, a slide within said track sized to open and close said window as it slides within said track, and, a volume of thermally expandable wax associated with said slide so as to contract to move said slide to open said window when said coolant is at said the lower temperature and expand to move said slide to close said window when said coolant is at the normal operating temperature, whereby, during normal radiator operation, said window remains closed by said slide, and when said coolant cools, said window opens, allowing any air in the first section of said top tank to float along said uppermost wall from said top tank first section, through said window and into said top tank second section.

* * * * *